US006908365B2

(12) United States Patent
Drake et al.

(10) Patent No.: US 6,908,365 B2
(45) Date of Patent: Jun. 21, 2005

(54) GENTLE-ACTING CARRIER-BASED GLASS-LIKE POLYSACCHARIDE ABRASIVE GRIT

(75) Inventors: Cameron Drake, Melbourne Beach, FL (US); Denis Monette, St-Bruno (CA); George Koutlakis, Greenfield Park (CA)

(73) Assignee: Archer Daniels Midland Company, Dectaur, IL (US)

( * ) Notice: Subject to any disclaimer, the term of this patent is extended or adjusted under 35 U.S.C. 154(b) by 275 days.

(21) Appl. No.: 10/401,799

(22) Filed: Mar. 31, 2003

(65) Prior Publication Data

US 2004/0121707 A1 Jun. 24, 2004

Related U.S. Application Data

(62) Division of application No. 09/860,102, filed on May 17, 2001.

(51) Int. Cl.$^7$ .................................................. B24C 1/00
(52) U.S. Cl. ................................. 451/38; 451/39; 134/7
(58) Field of Search .............................. 451/38, 39, 40, 451/76; 134/6, 7, 8

(56) References Cited

U.S. PATENT DOCUMENTS

| | | | |
|---|---|---|---|
| 2,426,072 A | * | 8/1947 | Wall .......................... 451/39 |
| 2,624,988 A | * | 1/1953 | Vander Wal ................. 451/39 |
| 4,828,542 A | | 5/1989 | Hermann |
| 5,066,335 A | | 11/1991 | Lane et al. |
| 5,098,621 A | | 3/1992 | Hermann |
| 5,146,716 A | | 9/1992 | Lynn |
| 5,207,034 A | | 5/1993 | Lynn |
| 5,234,470 A | | 8/1993 | Lynn et al. |
| 5,256,702 A | | 10/1993 | Grigat et al. |
| 5,256,703 A | | 10/1993 | Hermann et al. |
| 5,297,443 A | | 3/1994 | Wentz |
| 5,360,903 A | | 11/1994 | Lane et al. |
| 5,367,068 A | * | 11/1994 | Lane et al. ................. 536/124 |
| 5,405,648 A | | 4/1995 | Hermann |
| 5,507,596 A | | 4/1996 | Bostelman et al. |
| 5,529,589 A | * | 6/1996 | Lynn et al. .................... 51/293 |
| 5,780,619 A | * | 7/1998 | Lenz ....................... 536/123.1 |
| 6,159,257 A | | 12/2000 | Koutlakis et al. |

FOREIGN PATENT DOCUMENTS

WO     WO 02/092284 A1     11/2002

* cited by examiner

*Primary Examiner*—Robert A. Rose
(74) *Attorney, Agent, or Firm*—Kirkpatrick & Lockhart LLP

(57) ABSTRACT

A gentle acting blast media comprising glass-like polysaccharide grit suspended in a compressible carrier component.

10 Claims, No Drawings

GENTLE-ACTING CARRIER-BASED GLASS-LIKE POLYSACCHARIDE ABRASIVE GRIT

This application is a divisional of U.S. application Ser. No. 09/860,102, filed May 17, 2001, which is hereby incorporated herein by reference.

FIELD OF THE INVENTION

The present invention relates to carrier-based glass-like polysaccharide abrasive grit and, more particularly, to reusable glass-like, polysaccharide abrasive grit suspended within compressible carrier particles and to methods of using such materials in gently cleaning, polishing, and abrading particularly difficult to remove elastomeric materials from delicate bare and coated surfaces.

BACKGROUND OF THE INVENTION

Highly abrasive grit materials are well known in the art and are commonly used as blast media in sandblasting operations. Typical applications for highly abrasive grit blast media include cleaning building exteriors and removing surface coatings such as surface oxides on castings. In applications such as these, minor surface damage caused by the blasting operation is not of concern and abrasive grit which is relatively aggressive in removing surface coatings may be used. However, other applications exist in which the surface damage which results from the use of traditional highly abrasive grit blast media is unacceptable.

One example of a particularly sensitive application for abrasive grit materials is in the military and commercial aircraft industry. The removal of paint from exterior aircraft surfaces is periodically required for cosmetic purposes and to allow technicians to inspect the underlying metal and other surfaces for corrosion. However, aircraft surfaces clad with aluminum or made of composite materials are particularly sensitive to damage caused by conventional blast media.

Aircraft surfaces are typically clad with pure aluminum, which is softer than the underlying aluminum alloy the cladding is designed to protect. The soft layer of aluminum cladding is particularly susceptible to damage and erosion by traditional blast stripping operations, which can leave a very rough and unacceptable surface finish. Such damage to the aluminum cladding can result in premature corrosion that could necessitate the replacement of whole sections of an aircraft's skin. Furthermore, methods used for stripping aluminum clad structures may not be acceptable for structures made of composite materials such as fiberglass, graphite and aramid (Kevlar®), which are even more sensitive than aluminum to damage from blast media.

Prior art blast media used in aircraft applications include synthetic hard abrasive grit materials composed of thermosetting resins such as epoxy resin, urea resin, unsaturated polyester resin, alkyd resin, or harder resins such as polystyrene, polycarbonate or acrylic. Although less aggressive than conventional blast media, plastic blast media are sufficiently aggressive when used in paint stripping applications that skilled handling by trained personnel is required in order to avoid permanent damage to aircraft skins. Moreover, even skilled use of such blast media can result in reduced fatigue life, increased crack propagation and high surface roughness to the extent that such media is unacceptable for repeated use on aluminum clad or composite structures.

Gentler methods of paint removal involve the use of chemical solvents such as methylene chloride or phenol. However, health dangers and stringent environmental laws associated with the use of such volatile organic chemicals in paint stripping operations has made the use of such solvents impractical and undesirable. In some cases, companies have postponed aircraft exterior surface maintenance programs rather than attempt to deal with the regulations and costs associated with chemical stripping.

A series of related patents, owned by the assignee of the present invention, describe entirely new types of less destructive abrasive grit material. U.S. Pat. Nos. 5,066,335; 5,360,903; 5,367,068; 5,780,619; and 6,159,257 describe glass-like polysaccharide abrasive grit particles made from conventional starches, such as wheat and corn starches. These abrasive grit particles comprise a particulate polysaccharide glass-like solid in which moisture is occluded within the interstices of a matrix of polysaccharide molecules. The polysaccharide molecules may be partially cross-linked to increase the complexity of the matrix of polysaccharide molecules within the glass-like polysaccharide grit particles.

The glass-like polysaccharide abrasive grit compositions described in these patents enjoy several advantages over the prior art abrasive grit. Polysaccharide abrasive grit particles are less aggressive than plastic blast media, thereby avoiding the damage to aluminum clad structures caused by traditional blast stripping methods. As a result, use of polysaccharide abrasive grit is more forgiving and requires less skill in handling than plastic blast media. Use of polysaccharide abrasive grit allows aluminum clad aircraft skins to be subjected to repeated paint-and-strip operations. This is in contrast to plastic blast media which some aircraft manufacturers limit in paint stripping operations to only once in the lifetime of an aircraft, due to the potential damage to the aircraft's surface. Furthermore, polysaccharide abrasive grit particles are acceptable for use with both aluminum and composite materials, allowing for complete nose-to-tail paint stripping operations of aircraft. Finally, abrasive grit particles made of polysaccharides such as wheat and corn starch are non-toxic and biodegradable, reducing the health risks and disposal problems often associated with paint stripping operations. These advantages over other methods have allowed the glass-like polysaccharide starch grit particles described in these patents to gain wide acceptance in the industry for removing coatings from aircraft.

Additionally, the polysaccharide grit particles described in the aforementioned U.S. Pat. No. 6,159,257 have an additional advantage in that they maintain their integrity particularly well when placed in contact with liquid water and retain their usability as blast media particularly well after they are dried. In addition, the abrasive blast media described in this patent facilitate detection and clean up of particles that infiltrate the joints and seams present in blast-treated surfaces.

Certain applications relating to cleaning, polishing, and abrading delicate surfaces found in aircraft and elsewhere call for a blast media which is particularly gentle-acting. Such a gentle-acting blast media should produce cleaning, polishing, and abrading results as rapidly and efficiently as the polysaccharide grit media described above. If the previously patented polysaccharide grit media could be modified to achieve such a result, the art would be substantially advanced.

Additionally, the effective removal of certain elastomeric coatings from delicate substrates without damage to the substrate presents a particular challenge. Examples of such elastomeric coatings include, from the aerospace industry, the following: high strength aircraft integral fuel tank sealant (polysulfide); high strength, high temperature aerospace grade acetoxy paste sealants (silicone rubber); rapid cure primeness aircraft integral fuel tank sealant (alcohol/solvent-based); low density, high temperature aircraft integral fuel tank sealant (polysulfide); vertical surface sealant and bonding (silicone rubber); fuel and solvent resistant paste adhesive sealant (fluorosilicone); and medium density ablator/insulator aircraft thermal protection coating (filled elastomeric silicone (MA-25)). Such elastomeric coatings have Shore A hardness of about 40 to 60. A gentle-acting abrasive particle that would remove such materials with a Shore A hardness of about 40 to 60 without damaging delicate substrates would be a welcome addition to the armamentarium of abrasive grit products.

Finally, polysaccharide grit would be usable in cleaning and abrading interior surfaces of enclosed vessels such as the inner walls of the fuel tanks, for removing elastomeric sealants while leaving the underlying protective primer coat intact, it could be insured that the grit particles will be easily and completely removed from the vessels when the cleaning and abrading is complete. Thus, if the polysaccharide grit particles could be modified to float out on water or other solvents used to rinse such vessels, another substantial advance in the art would be at hand.

SUMMARY OF THE INVENTION

It is an object of the present invention to provide a particularly gentle-acting blast media.

A further object of the present invention is to provide a gentle-acting blast media that can effectively remove materials having a Shore A hardness of about 40 to 60 from delicate substrates without damaging the substrate.

Yet another object of the invention is to provide a gentle-acting blast media in which dust created during use of the media is minimized.

A further object of the invention is to provide a gentle-acting blast media that has substantially less rebound energy than conventional media upon impacting a surface being treated, thereby facilitating collection of the media.

A still further object of the invention is to provide gentle-acting carrier-based blast media in which the carrier component remains substantially intact after numerous blasting cycles.

Another object of the invention is to provide carrier-based gentle-acting blast media in which the carrier component breaks down as the blast process proceeds, exposing additional underlying blast media.

A still further object of the present invention is to provide a glass-like polysaccharide abrasive grit suspended or securely attached in a carrier component comprising compressible closed or open cell matrices.

Another object of the invention is to provide gentle-acting blast media which floats in water or other solvents to facilitate removal of the media particularly after use in the interior of enclosed vessels.

These and other objects of the invention will be better understood, by one skilled in the art, by having reference to the appended drawings and following description.

The invention thus comprises gentle-acting blast media comprising carrier-based glass-like polysaccharide abrasive grit particles which exhibits the above-described desirable characteristics. The glass-like polysaccharide abrasive grit is described in the aforementioned U.S. Pat. Nos. 5,066,335; 5,360,903; 5,367,068; 5,780,619; and 6,159,257, which are incorporated by reference. The carrier may be any suitable compressible material capable of being compressed when it strikes a surface between about 5% and 95% (preferably between about 50% and 90%) of its original cross-section and returning generally to its original dimension. Such carriers include, among others, compressible closed or open celled matrices in which the glass-like polysaccharide abrasive grit can be suspended or secured. Particularly preferred compressible materials are described in U.S. Pat. Nos. 5,529,589; 5,243,470; 5,256,703; and 5,146,716, which are incorporated by reference. To the extent that these references generally teach methods for suspending and securing abrasives, these teachings will apply as well to the suspension or securement of the glass-like polysaccharide abrasive grit of this invention in the carrier component. Additionally, where water is present in the carrier component or in the process used in suspending or securing the grit in the carrier, it is preferred that the polysaccharide material of the aforesaid U.S. Pat. No. 6,159,257 be used.

DETAILED DESCRIPTION OF THE INVENTION

In one embodiment, the carrier component of the present invention comprises a compressible lattice structure formed by a plurality of interconnected fibrous strands forming open or closed cells. In this embodiment, a plurality of discrete glass-like polysaccharide abrasive grit particles are present along with an adhesive component which attaches the discrete glass-like polysaccharide abrasive grit particles to the carrier component. This compressible lattice structure facilitates gentle contact of the discrete grit particles with the surface to be treated while resisting wear of the carrier component during use, so that the carrier component remains substantially intact after numerous blast cycles. The resulting carrier-based blast media has the ability to be propelled against a surface to be treated to produce minimal surface damage while limiting the creation of dust or fine particulate matter. The carrier component used in this embodiment of the invention and its manufacture are described in U.S. Pat. No. 5,529,589, the disclosure of which is incorporated by reference.

Another carrier for producing a gentle-acting compressible blast media comprises a lipophilic/hydrophilic, flexible, open cell water-foamable polymeric material such as a polyurethane-Wollastonite and/or staurolite interpolymer obtained by a chemical reaction under foam forming and interpolymer conditions, as described in detail in U.S. Pat. Nos. 5,243,470, 5,256,703, and 5,146,716, the disclosures of which are also incorporated by reference.

The gentle-acting carrier-based blast media of the present invention includes a carrier component having a plurality of glass-like polysaccharide abrasive grit, securely bonded or fastened thereto throughout the carrier material and optimally on the carrier surface by a suitable adhesive, resin, binder or the like. The glass-like polysaccharide abrasive grit particles may be bonded or fastened to the compressible carrier component secured at the intersection of fibers forming the lattice structure of the carrier component. It is to be appreciated, however, that the glass-like polysaccharide abrasive grit particles bonded or fastened to the carrier component may be secured however practical at any location within or on the surface of the carrier component.

The synergetic effects of suspending or attaching glass-like polysaccharide abrasive grit particles to the compressible carrier component will be evident by adding by weight from as little as 5% to as much as 95% by weight of the polysaccharide particles to the carrier. The optimal percentage of carrier versus grit will be dependent on the application, since increasing the concentration of grit in the carrier increases aggressiveness and dust production when the blast media is used. For example, the preferred range for removing elastomeric coatings and certain hard shell coating systems is 50% to 90% by weight glass-like polysaccharide abrasive grit particles.

The mesh size of the abrasive grit added to the carrier can vary between 8 and 120 mesh (U.S. standard). The preferred range of polysaccharide grit mesh sizes for removing elastomeric coatings and certain hard shell coatings is 16 to 80 mesh size. The compressible carrier particles should typically have an average axial length or diameter ranging from about 1 to 12 mm, with particle sizes between about 2 to 8 mm currently being preferred.

The method of manufacturing the above-noted carrier component, which is described in detail in U.S. Pat. No. 5,529,589, generally comprises providing a waste product or material, for example, a by-product from the die-cutting of fibrous packaging material, which is ground up into a plurality of fibrous particles ranging in length from approximately ¼" (0.635 mm) to ⅛" (0.318 mm). The overall shape and dimensions of the ground-up particles are not critical as long as the particles are sufficiently large in size to facilitate attachment or bonding of the polysaccharide grit.

The ground fibrous material sprayed or otherwise coated with an adhesive binder in a mixing device. Once the ground fibrous material and the applied adhesive are thoroughly mixed and the adhesive becomes sufficiently tacky, the desired quantity of polysaccharide grit is added, mixed in and allowed to set for a predetermined period of time appropriate to the adhesive binder and the ambient conditions, e.g. a few seconds to three (3) minutes.

If it is desirable for the carrier component to be slightly softer or more absorbent, a prepolymer can be added to the mixed components and reacted with steam and/or hot water. Since these prepolymers are moisture activated materials, when the prepolymer is exposed to steam and/or hot water, the moisture functions as a catalyst to speed up the reaction of the prepolymer with the fibrous carrier 4 and the added glass-like polysaccharide abrasive grit particles (preferably as in U.S. Pat. No. 6,159,257) to form a plurality of particles each incorporating a substantially uniform mixture of the ground carrier component, the abrasive component(s), and/ or the prepolymer. The mixture is thereafter allowed to react for a necessary period of time, e.g. a few minutes, depending on the type of the prepolymer employed and/or the amount of steam. Finally, the mixture is conveyed to and processed by a second grinder. The prepolymer typically fills and occupies the space between adjacent glass-like polysaccharide abrasive grit abrasive particles of each particle and is bonded or otherwise attached to such components to form a generally unitary structure.

The carrier component as described above comprises a plurality of strands, threads and the like which are interwoven, intermeshed, and/or attached with one another to form an open lattice support structure. The carrier component is very porous and this tends to increase the flowability of the carrier-based blast media through suitable blasting equipment. The lattice structure also tends to generally uniformly space the glass-like polysaccharide abrasive grit abrasive grit particles from one another.

Another possible carrier component comprises a compressible lipophilic/hydrophilic, flexible, open cell water-foamable polymeric materials such as a polyurethane-Wollastonite and/or staurolite interpolymer as described in U.S. Pat. Nos. 5,243,470, 5,256,703, and 5,146,716. The term "interpolymer" is used in these patents to indicate that the polyurethane is bound to the polysaccharide grit by a bonding mechanism which may be hydrogen bonding, chemical bonding, complex, or adsorptive or absorptive bonding, rather than being merely an admixture of the components. The bonding can be combinations of the above. The interpolymer of the invention can be for example the cured product of a mixture of substantially linear isocyanate capped polyether polyol prepolymer, having an average functionality of less than 2, a cell formation regulating amount of surfactant and water.

The above-referenced lipophilic flexible open cell urethane-Wollastonite interpolymer is obtained by reacting, under interpolymer and urethane forming conditions, (a) a substantially linear isocyanate capped prepolymer having a reactive functionality of less than 2 mixed with (b) an aqueous solution comprising Wollastonite and surfactant. Preferably the interpolymer has an active functionality of from about 1.3 to about 1.9, and more preferably of from about 1.5 to about 1.8. The linear polyether polyol is derived from a difunctional, active hydrogen-containing initiator and one or more 1,2-epoxides which will impart hydrophilic properties to the resulting polyol, or from ethylene glycol and ethylene oxide or prepared from a substantially linear polyether polyol.

As explained in the above-referenced patents, the prepolymer may be prepared with a toluene disocyanate (TDI); the acrylic is preferably an acrylic latex, the gypsum may be US Hydrostone gypsum and the surfactant is a preferably non-ionic surface active agent with from about 0.5 to about 5.0 percent surface active agent by weight of prepolymer added to the interpolymer, preferably from about 1.0 to about 2.0 percent surface active agent by weight of prepolymer. Generally from about 6.5 to about 400 moles of water are reacted with the prepolymer, preferably from about 20 to about 200 moles of water. This differs from other urethanes where stoichiometric amounts of water are used.

The prepolymer is chemically reacted with a large molar excess of water. The water is provided as an aqueous solution containing other components, such as Wollastonite and/or Staurolite and a surfactant which are all readily dispersed or soluble within the water. If desired, the prepolymer and/or the aqueous mixture can contain one or more other active ingredients. For example, an activated carbon or aqueous mixture for absorption of specific contaminant materials may also be included in the aqueous phase to be mixed with prepolymer.

A variety of different compressible materials having different lattice structures will function very well as the above described carrier components. For example, lattice structures made from urethane, nylon, polypropylene and polyvinyl alcohol should work well. Also, the lattice structure may be chosen so that it does not readily break down upon impacting the surface being cleaned, polished or abraded while still exposing the glass-like polysaccharide abrasive grit. Such a lattice structure that remains substantially intact after a plurality of blasting cycles will minimize the amount of fiber waste generated by using the fiber media according to the present invention. Alternatively, the lattice may be one which wears during use, exposing additional underlying polysaccharide grit for treating the surface.

The porosity of the carrier will facilitate suspending or securing the glass-like polysaccharide abrasive grit while promoting uniformed dispersion of the grit within the carrier. Any glass-like polysaccharide abrasive grit carried on the surface of the carrier is available for direct contact with the surface to be treated. Due to the compressibility of the lattice structure of the carrier, the grit located below the surface will be able to contact the surface being treated as the carrier compresses and flattens out upon impacting the surface being cleaned, polished or abraded. The above and other characteristics of the carrier component result in a media which gently cleans, polishes or abrades at an acceptable cutting rate and in a way not know in the prior art.

The carrier may be two dimensional, e.g. planar, or it may be three dimensional. In addition, the lattice structure may have a uniform repeating pattern, similar to a screen, or it may have an arbitrary or random arrangement of interconnected fibers.

Bactericide or fungicide can also be included in the carrier to prevent bacterial or mold growth.

The media of the invention can be used to clean oil or contaminants from industrial equipment such as in machine shops, blow molds, paper mills, ducts, manufacturing plants, paint, restaurants etc. The polysaccharide grit of the aforementioned U.S. Pat. No. 6,159,257 is presently preferred for such applications.

Although the polysaccharide grit is incorporated into larger carrier component particles, the grit still has a substantially unaffected surface profile. This allows the grit to impact the surface to be treated and achieve maximum penetration into that surface.

Finally, if the media is used to blast without a nozzle, larger compressible carrier component particles could be used.

EXAMPLES

The examples set out below are illustrative of methods of using preferred starch-based glass-like polysaccharide grit particles of the present invention and are not intended to be construed as limiting the invention.

Example 1

Effectiveness and Reuse Potential

A study was conducted to determine the approximate reuse potential (life) of an experimental dry stripping media made from a corn hybrid polysaccharide blast media (prepared in accordance with the teaching of U.S. Pat. No. 6,159,257) entrained in a carrier (sponge) component prepared (in accordance with the teaching of U.S. Pat. No. 5,256,703).

Preliminary work showed that the carrier-based media was effective in elastomeric sealant removal. The media was also shown to be effective in the removal of other elastomeric coatings such as found on certain radomes. The majority of the work performed used the following blast parameters:

nozzle pressure: 48–52 psi
media flow rate: 4–5 lbs/minute
nozzle/surface distance: 3–6 inches Sample Description The average diameter range of the media entrained in the sponge carrier was 3–6 mm.

The consumption test was conducted in an experimental blast room. The following test specimens were blasted during each blast cycle using constant parameters:

C-130 radome section, paint removal
KC 135 aluminum skin section, structural sealant removal
Boeing 707 wing section, fuel tank sealant removal
2024 T3, aluminum test panel 0.032 inch thick, alclad (alclad profile after blast)

The blast parameters used for the consumption tests were:

nozzle pressure: 50 psi
nozzle/surface distance: 3–6 inches
media flow rate: 3–5 lbs/minute
nozzle type: 0.375 inch double venturi Each test specimen was blasted approximately 30 seconds during each cycle. The remaining time the media was projected against a 0.250 inch thick aluminum plate. After each blast cycle, the media was recovered from the floor and put in to a Sweeco vibratory screening unit to remove the fine particles. The bottom screen on the unit was a #14 sieve (US Std.). To prevent any media from leaving the blast room during the blasting operation, the ventilation system was not activated. The test results were as follows:

| CYCLE NUMBER | START WEIGHT | AFTER SCREENING | BLAST TIME |
|---|---|---|---|
| 1 | 19.0 | 18.2 | 5 min 40 sec |
| 2 | 18.2 | 17.6 | 4 min 41 sec |
| 3 | 17.6 | 17.0 | 4 min 11 sec |
| 4 | 17.0 | 16.6 | 4 min 6 sec |
| 5 | 16.6 | 16.2 | 3 min 50 sec |
| 6 | 16.2 | 15.8 | 4 min 7 sec |
| 7 | 15.8 | 15.2 | 3 min 44 sec |
| 8 | 15.2 | 14.8 | 3 min 40 sec |
| 9 | 14.8 | 14.2 | 3 min 28 sec |
| 10 | 14.2 | 13.6 | 3 min 20 sec |

During the blasting it was noticed that the media became slightly more aggressive after cycle #2 and remained constant until cycle 8. After cycle #8 it was noticed that the alclad surface was more affected, most likely due to a higher concentration of small particles and loose media.

Conclusion

The compressible carrier-based polysaccharide grit appears to have the characteristics required to effectively remove thick/aged fuel tank sealant with minimum effects on the substrate. It will remove thick elastomeric coatings at an acceptable rate from delicate surfaces without causing damage and from metallic surfaces without removing the primer.

Example 2

Dust Production

To determine the approximate differences in the quantity of airborne dust produced by a compressible carrier-based polysaccharide grit versus a standard polysaccharide grit, an experiment based on the principles and spirit of ASTM D 1739-98 was performed. The objective was to measure dustfall (settleable particulate material) over time.

A stainless steel container measuring 6.5 in×22 in×6 in deep was placed 8.5 ft high in a blast room approximately 1 foot from the wall. The blast room dimensions were 10 ft wide×15 ft long and 10 ft high, for this experiment the dust removal system normally operating in the blast room was de-activated. The blasting set-up was identical for both media types with the exception of nozzle pressure where the typical pressure for each type was used. The blast direction was the opposite direction to the container (away and below).

nozzle to surface distance to aluminum blast target: 3 inches blast room target height: 3.5 ft (horizontal)
nozzle to target surface angle: 45 degrees
distance of rebound media stream to blast room wall: 10 ft
distance of secondary rebound (wall) to container: 13 ft
nozzle type: 0.375 inch double venturi
media flow rate: 4–5 lbs per minute
approximate amount of media projected: 15–20 lbs
approximate time to blast (blast cycle): 3.0–5.5 minutes Results For the standard polysaccharide (wheat) media a nozzle pressure of 35 psi was used. During the blast cycle, considerable amounts of dust/particles clouds (turbulence) were visually observed through the blast room window. After only 1 blast cycle, 15.5 grams of material was collected from the container.

For the carrier-based polysaccharide media a nozzle pressure of 50 psi was used. During blasting, the large carrier particles were observed having low speed rebounds and a very small amount of airborne dust was visually observed during each blast cycle. After 10 blast cycles, a total of only 0.77 grams of dust was collected from the container.

The results of the experiment confirms visual observations that carrier-based polysaccharide grits produces considerably less nuisance dust than the standard polysaccharide media.

Example 3

Comparison to Conventional Grit

A series of comparative coating removal tests were conducted to determine the potential of carrier-based polysaccharide grit versus conventional polysaccharide grit in removing a variety of materials including elastomeric materials with a Shore A hardness of about 40 to 60.

Unlike the conventional grit, the carrier based polysaccharide was not found to be successful at removing typical MIL Spec coating systems and similarly prepared commercial types of coating systems from metallic surfaces. The carrier-based polysaccharide media was also not successful at removing coatings from certain radomes, snowmobile hoods, plastic automobile bumpers, interior aircraft panels, certain painted wood and stained woods. However, the carrier-based polysaccharide grit of the present invention was found to be equal or better than conventional polysaccharide grit in removing the following elastomeric materials with a Shore A hardness of about 40 to 60:

aerospace sealants
  large body commercial aircraft structure rubber cements
  business jets and aerospace sealants
  fuel tank sealants
  airplane thermal sealant MA 25 (type 2 and 5)
  GE RTV 60 sealant/adhesive
  KC 135 structural sealant
  Boeing 737 structural sealant
  ATR 42 structural sealant
  F-15 (ICR) radome (selective stripping to rain erosion layer)
  B-52 radome
  C 141 radome
  Pratt Whitney JT 8D composite engine tiles (clean sealant from delicate substrates)
  selective strip of low observable coating of large military aircraft type
  selective strip of low observable coating of small military aircraft type
  selective strip of low observable coating of military naval vessel Example 4

Almen Arc Heights

Sand, plastic, walnut shells, bicarbonate of soda, $CO_2$, high water pressure, sponge media with aluminum oxide, and even starch media produce varying almen arc heights when blasted for 30 seconds on almen strips. In this example, using a nozzle pressure of 50 psi and a stand off distance of 3 to 5 inches, four almen strips (A1.2024 T3 bare 0.032 inch thick) were exposed for 30 seconds each with the gentle-acting carrier-based blast media of the present invention. Measurements made afterwards showed no arc heights but a slight negative value.

This suggests that even if there is sufficient erosion and kinetic energy to remove very thick coating systems, there are little or no effects on solid substrates.

This also demonstrates that the gentle-acting carrier-based blast media of the present invention, despite being projected at surface speeds of several hundred feet per second, does not produce sufficient compressive residual stress on thin aluminum to cause arc height on an almen strip.

Example 5

Cleaning Fuel Tanks

Aircraft fuel tank sealants must be removed when: a fuel leak occurs, a component such as a fuel pump must be replaced and sealant prevents its removal, or to allow visual or nondestructive inspection of the surface under the sealant to detect corrosion or cracks. After the fuel is removed from the aircraft fuel tank and the tank is vented and rendered inert, there are two options:

1. An aircraft technician wearing special fuel tank equipment (full breathing mask with breathing air hose and special coveralls, ear plugs, and leather work gloves) enters the fuel tank. Lighting is typically provided by special lights used for hazardous conditions. Conventional blast media would be used. A blast hose would be fed into the tank to the operator and the operator would aim the blast nozzle at the area requiring stripping. Used media recovery would then be removed principally by vacuuming.

2. Operations are conducted by remote control using conventional blast media, flexible manipulators, and a closed circuit television system enabling remote viewing of the blasting operation as described in U.S. Pat. Nos. 5,297,443 and 5,507,596. Media recovery again would be principally by vacuuming.

In this example, a gentle-acting blast media comprising glass-like polysaccharide grit suspended within compressible carrier particles is used in lieu of the conventional or known blast media. Media recovery of this compressible carrier-based material can, however, be achieved by filling the tank with water to float out the media, emptying and drying the tank and discarding the water-borne spent media. The media recovery would be substantially easier, more efficient, and safer than that achieved by vacuuming conventional media.

Example 6

Measuring Compressibility of Compressible Carrier Particles

In this example, a test method that can be used for determining the compressibility of carrier particles, as that term is used above in connection with the present invention, is described.

Summary of Test Method

Four carrier specimens of relatively equal shape, size, and weight (before addition of glass-like polysaccharide grit) are placed on a thin rigid strip positioned to give a four point support for an identical strip placed on top of the specimens. The gap between the two strips is measured before a weight is gently placed on the strip, during the weight application, and after its removal. The weight must be large enough to compress the particles but not so heavy as to permanently deform them more than about 10%. The results gauge the compressibility of the carrier particles.

Details of Test Method

Equipment two small aluminum strips 3.0 inch long×0.75 inch wide× 0.032 inch thick, straight strips must be used no more than 0.0001 inch deflection from the center vernier caliper standard 1 kg, 2 kg, and 5 kg calibrated weights Rotap sieve instrument sieve plates tweezers Procedure 1. After sample splitting and Rotap sieving to obtain the required mesh size range (eg. 4, 8, or 10 mesh US standard size), select four like-sized carrier particles of approximately the same shape.
2. Place one aluminum strip on a stable, flat surface such as a granite lab bench.
3. Using the tweezers, place the four particles at the four corners of the strip approximately 0.75 inch from the end edges of the strip. The particles are thus positioned to provide a four point support for the second aluminum strip which is then gently placed on top of the carrier particles, ensuring that none of the particles protrudes from the side edges of the strip.
4. Using the vernier caliper, measure the gap between the two strips. If one side is over 10% different in gap size than the other side, select other more uniform particles. Record the gaps at both end edges, divide the sum of the readings by two and record as the initial gap.
5. Gently place the calibrated weight centered on the top surface of the strip, making sure not to cover the top strip at either end, to ensure access for measuring the gap.
6. Using the vernier caliper, measure the gap (now compressed) between the two strips. Record the gap at both edges, divide the sum of the readings by two, and record as the compressed gap.
7. Gently remove the weight from the strip. Measure the gaps at both ends, record, divide the sum of the readings by two, and record as the recovery gap. The recovery gap should be within about 10% of the initial gap. If the recovery gap is outside of this, a lighter weight should be used.
8. Repeat the test at least three times using different particles from the sample being tested.

Results

Sponge type carrier (U.S. Pat. Nos. 5,243,470, 5,256,703, and 5,146,716)

weight applied: 2 kg initial gap: 0.126 inch compressed gap: 0.015 inch recovery gap: 0.123 inch compressibility: 89.1%

It will be apparent to those skilled in the art that modifications may be made without departing from the spirit and scope of the invention. Accordingly, it is not intended that the invention be limited except in view of the appended claims.

What we claim is:

1. A method for removing elastomeric material with a Shore A hardness of about 40 to 60 from a substrate with little or no damage to the substrate, comprising:

preparing a gentle-acting blast media comprising glass-like polysaccharide grit suspended within compressible carrier particles, wherein said compressible carrier particles are capable of being compressed between about 5% to 95% of the original cross-section of the carrier particles when the gentle-acting media strikes a surface; and projecting the gentle-acting blast media against the substrate until the elastomeric material is removed.

2. The method of claim 1 which the substrate is coated with a primer, the primer being substantially unaffected by the gentle-acting blast media.

3. The method of claim 2 which the primer is a polyamide epoxy primer.

4. The method of claim 1 in which the material is a polysulfide sealant.

5. The method of claim 1 in which the elastomeric material is silicone rubber.

6. The method of claim 1 in which the elastomeric material is fluorosilicone rubber.

7. The method of claim 1 in which the substrate is an aircraft skin.

8. The method of claim 1 in which the substrate is intersecting sections of an aircraft fuel tank.

9. A method of cleaning interior surfaces of enclosed vessels comprising:

preparing a gentle-acting blast media comprising glass-like polysaccharide grit suspended within compressible carrier particles, wherein said compressible carrier particles are capable of being compressed between about 5% to 95% of the original cross-section of the carrier particles when the gentle-acting media strikes a surface;

projecting the gentle-acting blast media against the substrate; and filling the tank with water to float out the media.

10. The method of claim 9 in which the enclosed vessel is an aircraft fuel tank.

* * * * *